United States Patent [19]

Woodling

[11] 3,871,303
[45] Mar. 18, 1975

[54] TRANSPORTATION SYSTEM

[75] Inventor: Gerald L. Woodling, Akron, Ohio

[73] Assignee: The Goodyear Tire & Rubber Company, Akron, Ohio

[22] Filed: Feb. 25, 1974

[21] Appl. No.: 445,446

[52] U.S. Cl............... 104/173, 104/20, 104/25, 104/168, 104/205, 104/209, 104/214, 104/217
[51] Int. Cl............................................. B61b 9/00
[58] Field of Search .......... 104/173, 178, 152, 214, 104/20, 25, 28, 30, 18, 165, 168, 186, 198, 199, 202, 204, 205, 209, 217, 190

[56] References Cited
UNITED STATES PATENTS

| | | | |
|---|---|---|---|
| 1,083,308 | 1/1914 | Thurston.......................... | 104/209 X |
| 2,756,686 | 7/1956 | Kendall et al..................... | 104/20 X |
| 3,012,517 | 12/1961 | Gale................................ | 104/28 |
| 3,541,962 | 11/1970 | Avery............................. | 104/178 X |
| 3,662,691 | 5/1972 | Guirand........................... | 104/173 |
| 3,797,407 | 3/1974 | Laurent........................... | 104/173 X |

Primary Examiner—Lloyd L. King
Assistant Examiner—Randolph A. Reese
Attorney, Agent, or Firm—F. W. Brunner; R. P. Yaist; F. K. Lacher

[57] ABSTRACT

A vehicle drive system in which acceleration and deceleration of vehicles between the high speed sections and low speed sections is provided by variable speed cables gripped by the vehicles and driven at gradually changing speeds. The vehicles may be driven in the high speed section by a single high speed cable. A clamping mechanism on each of the vehicles has grips for selectively gripping the high speed cable in the high speed section and the appropriate variable speed cable in the acceleration and deceleration sections of the system.

15 Claims, 15 Drawing Figures

TRANSPORTATION SYSTEM

This invention relates generally, as indicated, to the drive system of a multiple vehicle conveyor for passengers or articles where the vehicles are driven by an endless member such as a cable in the high speed section and by one or more additional endless members in the acceleration and deceleration sections of the system. These endless members may also drive the vehicles through the low speed station sections. Each of the vehicles has a clamping mechanism with two or more grips for gripping the endless members in certain sections of the system and transferring the drive of the vehicles from one endless member to another.

Heretofore, transportation systems have been proposed in which vehicles have been driven by cables in the high speed section and by traction wheels or screws in the acceleration and deceleration sections.

In the threadless screw drives, there have been wear problems with the follower wheel and substantial power lost through friction. In the threaded screw drives, the screw must be properly supported for rotation and driven to propel the vehicles.

The traction wheel acceleration and deceleration drives require a large number of components including the shafts, wheels and drives which increases the initial cost and maintenance required. There is also a problem because the drive is through clutches or through speed controls to vary the speed of rotation of the driving wheels.

In both of these systems, the problem of converting to another form of drive must be overcome so that these drives will be compatible with the cable drive in the high speed section. There have also been noise level and ride quality problems with these systems.

With the foregoing in mind, it is the principal object of this invention to provide a vehicle drive system having a variable speed endless drive member for driving vehicles in the variable speed section of the system.

Another object of the invention is to provide multiple endless drive members in the variable speed section of the system for driving a number of vehicles individually at different changing speeds.

A further object of the invention is to provide a clamping mechanism for gripping one endless drive member in one section of the system and for gripping another endless drive member in another section.

A still further object of the invention is to provide for selectively positioning the grips of the clamping mechanism to grip selected endless drive members which will drive each vehicle at the desired speed in a particular section of the system.

Another object of the invention is to provide for actuating the clamping mechanism by engagement of the grips with cams mounted along the conveyor path and for positioning of the clamping grips by other cams movable transversely of the path.

A further object of the invention is to provide a constant speed endless drive member which drives the vehicles to the variable speed sections of the conveyor system, is bypassed around the variable speed sections and then continues to drive the vehicles away from the variable speed sections.

Another object of the invention is to provide separate endless drive members for the acceleration and deceleration sections of the conveyor system.

Still another object of the invention is to provide variable speed endless drive members which extend through the deceleration, acceleration and station sections to provide the desired speeds in these sections.

Another object of the invention is to provide a separate drive through the low speed station section and variable speed endless drive members extending through the deceleration and acceleration sections and bypassing the station section for driving vehicles in the acceleration and deceleration sections.

These and other objects of the invention are provided by a high speed cable drive in the cruise or constant speed section and one or more variable speed cables in the station and/or the deceleration and acceleration sections for individually varying the speeds of each vehicle in these sections. The clamping mechanism provides the switching of the drives between the constant speed and variable speed sections of the system.

To the accomplishment of the foregoing and related ends, the invention, then, comprises the features hereinafter fully described and particularly pointed out in the claims, the following description and the annexed drawings setting forth in detail a certain illustrative embodiment of the invention and several modifications, these being indicative, however, of but some of the various ways in which the principles of the invention may be employed.

Figure 1:
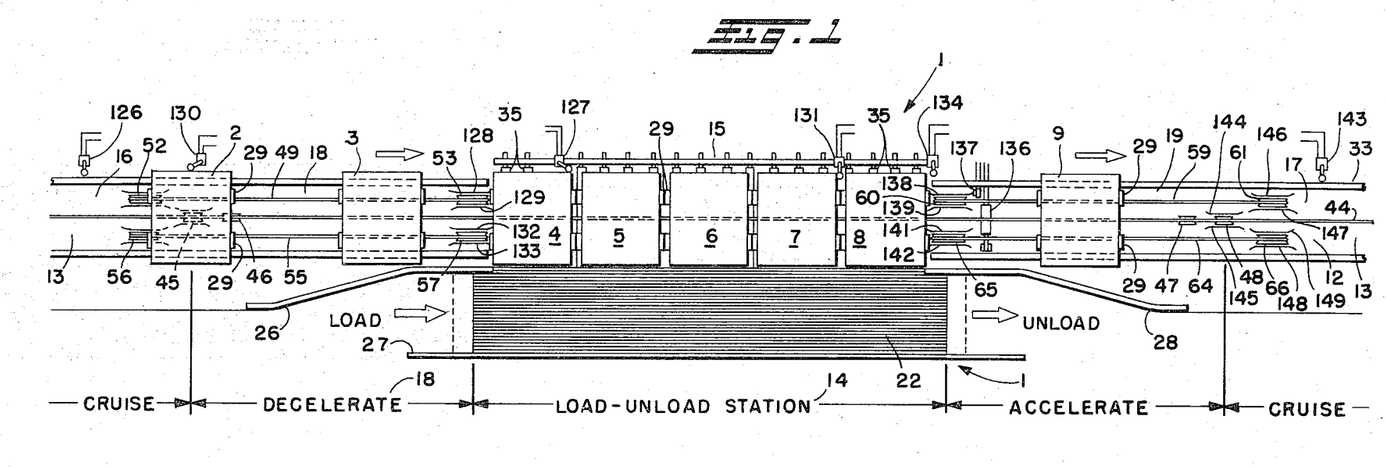
FIG. 1 is a schematic plan view of a portion of a passenger conveyor system incorporating the preferred form of the invention showing vehicles in the cruise, deceleration, acceleration and station sections.
Figure 2:
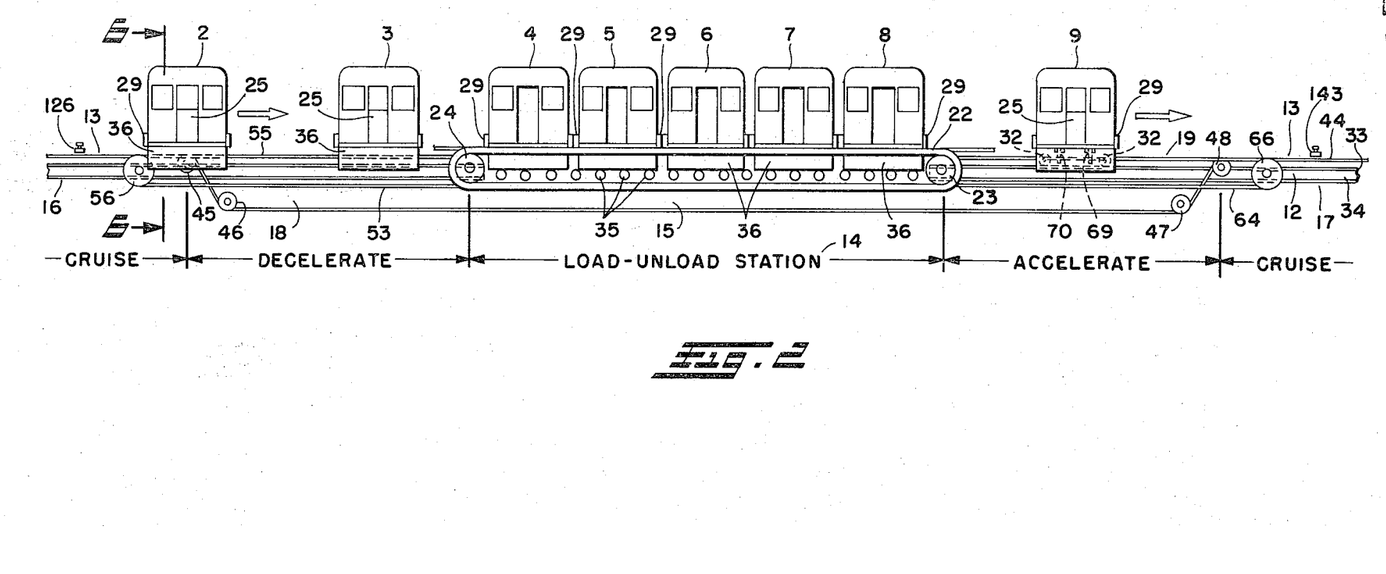
FIG. 2 is a schematic side elevation of the portion of the passenger conveyor system shown in FIG. 1.

Referring to FIGS. 1 and 2, there is schematically shown a vehicle drive system 1 for conveying passengers in vehicles 2 through 9 driven along a path 12. The path 12 includes a cruise or constant high speed section 13 which may be interrupted at a load-unload station 14 where the vehicles 4 through 8 are driven at a different speed which is generally around one and one-half miles per hour or less and is substantially lower than the speed the vehicles are driven in the high speed section 13. The vehicle drive system 1 has a different or low speed section 15 at the load-unload stations 14. Also located between the low speed section 15 and spaced-apart portions 16 and 17 of the high speed section 13 are variable speed sections such as deceleration section 18 and acceleration section 19. As shown in FIGS. 1 and 2, the vehicle 2 is passing from the high speed section 13 into the deceleration section 18. The vehicle 3 is in the deceleration section 18. The vehicles 4 through 8 are in the low speed section 15 at the load-unload station 14 and the vehicle 9 is in the acceleration section 19.

At the load-unload station 14, a moving platform such as belt 22 is located alongside the vehicles 4 through 8 and is driven at the same speed as the vehicles by a suitable drive motor (not shown) connected to drive pulley 23 at the unload end of the station. An idler pulley 24 supports the belt 22 at the loading end of the station 14. The vehicles 2 through 9 have doors 25 which are automatically opened in the load-unload station 14 and closed otherwise so that passengers cannot leave the vehicles except at the station where they can step out onto the belt 22 or enter from the belt. Protective balustrades 26, 27 and 28 are provided to retain the passengers on the belt 22 and separated from the path 12 where the vehicles are not in abutting relationship, as shown in FIGS. 1 and 2. Bumpers 29 of a yieldable material such as rubber are provided at the ends of the vehicles for engagement in the load-unload station 14.

Figure 6:
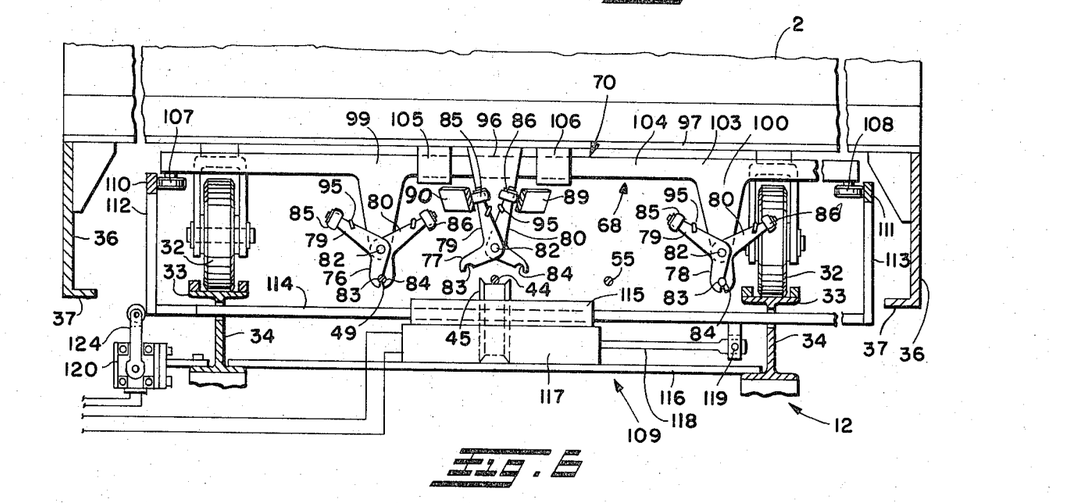
FIG. 6 is an enlarged sectional view taken along the plane of line 6—6 in FIGS. 2 and 5, with parts being broken away.

As shown in FIG. 6, the vehicles 2 through 9 have supporting wheels 32 for rolling engagement with flanges 33 of beams 34 forming a track on which the vehicles roll. The beams 34 are supported on a track base of reinforced concrete or other suitable material (not shown).

In the embodiment shown in FIGS. 1 through 6, the beams 34 do not extend through the low speed section 15 and the vehicles 2 through 8 are supported and driven on a plurality of transversely extending rollers 35. The vehicles 2 through 9 have side plates 36 extending downwardly from the sides of the vehicles to flanges 37 which engage and roll along the rollers 35. As shown more clearly in FIG. 4, the rollers 35 at the loading end of the station 14 have sprockets 38 in driven engagement with a chain 39 which is driven by a driving sprocket 42 connected to a motor 43.

Figure 3:
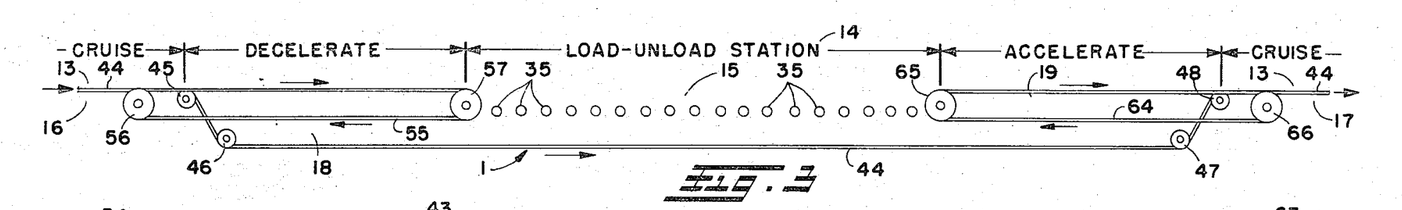
FIG. 3 is a diagramatic side elevational view like FIG. 2 showing the cable and roller drive.
Figure 4:
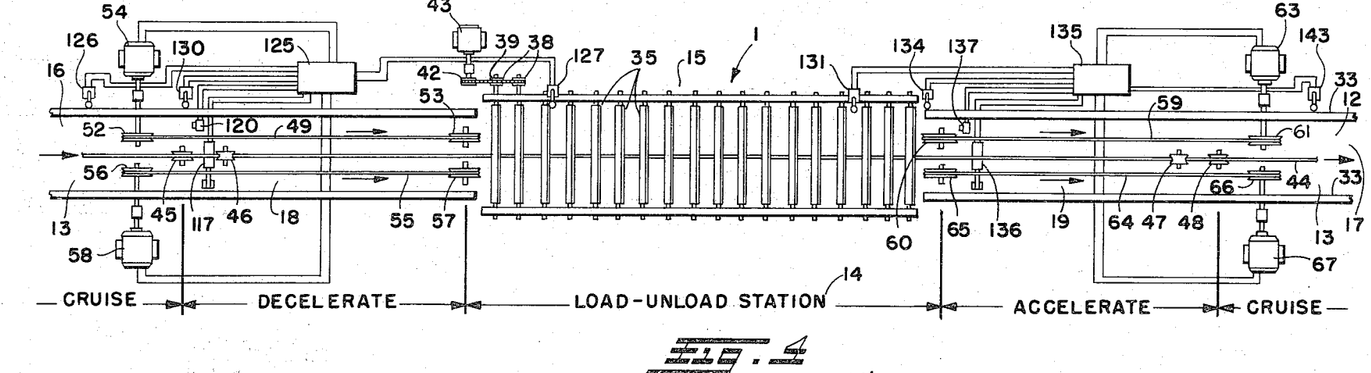
FIG. 4 is a diagramatic plan view of the drive system shown in FIG. 3.

Referring to FIGS. 3 and 4, an endless driving member such as a high speed cable 44 of wire or other suitable material extends through the portion 16 of the high speed section 13 over a high speed pulley 45 and then downward around high speed pulleys 46 and 47 which divert the high speed cable around the deceleration section 18, low speed section 15 and acceleration section 19. An exit high speed pulley 48 returns the high speed cable 44 to the portion 17 of the high speed section 13 at the other side of the load-unload station 14. The high speed cable 44 may be driven by a drive pulley connected to a motor with suitable take-up equipment in a manner well known in the art.

In the deceleration section 18 of the vehicle drive system 1, a second endless driving member such as second cable 49 extends from a drive pulley 52 at the high speed end of the deceleration section over suitable take-up equipment (not shown) to a deceleration idler pulley 53 at the station end. A deceleration drive motor 54 is connected to the drive pulley 52, as shown in FIG. 4.

A third cable 55 extends between a deceleration drive pulley 56 at the high speed end of the deceleration section 18 over suitable take-up equipment (not shown) to a deceleration idler pulley 57 at the station end of the deceleration section. A deceleration drive motor 58 is connected to the deceleration drive pulley 56, as shown in FIG. 4.

In the acceleration section 19 of the vehicle drive system 1, a second cable 59 extends between an acceleration idler pulley 60 at the station end of the acceleration section and an acceleration drive pulley 61 at the high speed end of the section. An acceleration drive motor 63 is connected to the drive pulley 61, as shown in FIG. 4. A third cable 64 extends between an acceleration idler pulley 65 at the station end of the acceleration section 19 and an acceleration drive pulley 66 at the high speed end of the acceleration section. An acceleration drive motor 67 is connected to the acceleration drive pulley 66, as shown in FIG. 4. Suitable take-up equipment (not shown) is also provided for cables 59 and 64.

Referring to FIGS. 1, 2, 5 and 6, vehicles 2, 3 and 9 are cable driven through a clamping mechanism 68 mounted on the underside of the vehicles for gripping the cables. Preferably, this clamping mechanism 68 includes two grip-carrying assemblies 69 and 70 spaced longitudinally along the vehicles providing a forward set of grips 73, 74 and 75 on assembly 69 and a rearward set of grips 76, 77 and 78 on assembly 70. Since the grip-carrying assemblies 69 and 70 are identical, the following description will only refer to assembly 70; however, it is understood that this description also applies to assembly 69.

Figure 5:
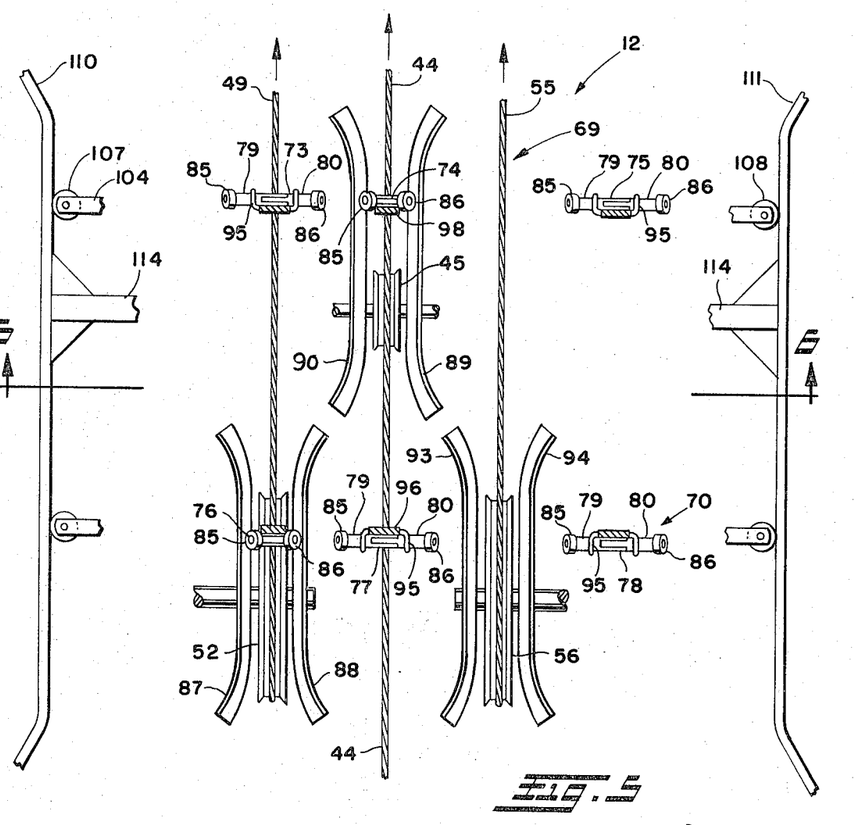
FIG. 5 is an enlarged diagramatic plan view like FIG. 4 showing the position of the cable clamping grips and the cam surfaces for actuating the grips as well as the guideways for positioning the grips.

Referring to FIGS. 5 and 6, each of the grips 76, 77 and 78 has a pair of lever arms 79 and 80. The lever arms 79 and 80 are pivotally connected at a point intermediate the ends of the arms by a pin 82. At the lower ends of the lever arms 79 and 80, cable clamping shoes 83 and 84 are provided for gripping the cables. At the upper ends of the lever arms 79 and 80, cam rollers 85 and 86 are rotatably mounted for engagement with cam members such as guide plates 87 and 88 mounted along the path 12 above the second cable 49, guide plates 89 and 90 mounted along the path above high speed cable 44 and guide plates 93 and 94 mounted along the path 12 above third cable 55. The grips 76, 77 and 78 have resilient means such as a spring wire 95 bent around the lever arms 79 and 80 in such a manner as to bring the cable clamping shoes 83 and 84 together in cable clamping relationship.

The central grip 77 is hingedly mounted on a post 96 extending downwardly from and mounted on a bottom plate 97 of the vehicle 2. The front center grip 74 is also mounted on a post 98 fastened to the bottom plate 97 of the vehicle 2.

The two side grips 76 and 78 are hingedly mounted by pins 82 to side posts 99 and 100 of a carriage 103 having a transverse bar 104 slidably supported in brackets 105 and 106 mounted on the underside of the vehicle 2 on bottom plate 97. Guide wheels 107 and 108 are rotatably mounted at the ends of the bar 104 for engagement with a grip positioning mechanism 109. Guide rails 110 and 111 of this mechanism 109 are positioned for engagement with the guide wheels 107 and 108. The guide rails 110 and 111 are supported by arms 112 and 113 extending downwardly to a transversely extending rod 114 slidably mounted in a base member 115 supported on a cross member 116 fastened to the beams 34, as shown in FIG. 6. The rod 114 is moved transversely of the path 12 by a suitable actuating means such as a solenoid 117 in the base member 115 having an actuating arm 118 connected to a lug 119 fastened to the rod 114.

As shown in FIGS. 5 and 6, the solenoid 117 has been actuated to move the rod 114 to the right causing the rails 110 and 111 to engage the rollers 107 and 108 for positioning the bar 104 to the right with grip 76 in alignment over the second cable 49. As shown in FIG. 5, the grip 76 is opened at the entrance end of the deceleration section 18 by engagement with the guide plates 87 and 88 to clear the idler pulley 52 and thereafter clamp the cable 49. The grip 78 is displaced away from the cable 55 and guide rails 93 nd 94 so that there is no engagement with the third cable 55.

A limit switch 120 is mounted on one of the beams 34 and has an arm 124 engageable by the rod 114 when the grip 78 is in position for engagement with the third cable 55. This provides a signal to a suitable control apparatus 125 for verifying which cable is to be gripped. The solenoid 117 is also connected to the control apparatus 125.

A limit switch 126 is also mounted along the path 12 of the vehicle drive system 1 at a position for engagement by a vehicle prior to entering the deceleration section 18. The signal from the limit switch 126 is transmitted to the control apparatus 125 to indicate the approach of a vehicle so that proper controls may be initiated to actuate solenoid 117 so that the side grips 76 and 78 are positioned correctly for gripping the appropriate cable.

The drive motors 54 and 58 are connected to the control apparatus 125 and upon entrance of a vehicle into the deceleration section 18, the speed of the second cable 49 or third cable 55 to which the vehicle is attached is the same as the speed of the high speed cable 44.

A limit switch 130 is mounted along the path 12 at a position at the entrance end of the deceleration section 18 and is connected to the control apparatus 125. The signal from the limit switch is transmitted to the control apparatus 125 gradually reducing the speed of the motors 54 or 58 so that when the vehicle reaches the end of the deceleration section 18, the vehicle will have a speed which is the same as the speed of the vehicles 4 through 8 in the low speed section 15 of the system. A limit switch 127 is mounted at the entrance end of the low speed section 15 for engagement by the vehicles to transmit a signal to the control apparatus 125 that the vehicle has left the deceleration zone and the appropriate cable is available for another vehicle entering the deceleration zone. This cable is also accelerated to a speed the same as the speed of the high speed cable 44.

Guide plates 128 and 129 mounted along the path above the second cable 49 at the end of the deceleration section 18 are engageable with grips 73 and 76 to disengage them from the cable as the vehicle moves out of the deceleration section. Likewise, guide plates 132 and 133 are mounted along the path above the third cable 55 at the end of the deceleration section 18 to engage the grips 75 and 78 for spreading them to release the grips from the cable as the vehicle leaves the deceleration section.

In the low speed section 15, the vehicles 4 through 8 are driven by the rollers 35 connected to the sprockets 38 at the entrance end of the low speed section so that the vehicle 4 at the entrance end pushes all of the other vehicles through the bumpers 29 providing an accumulator effect for correcting the vehicle spacing at the entrance to the low speed section. In this way, the vehicles 4 through 8 are maintained close together in the load-unload station 14 and there is no danger of passengers falling between the vehicles.

A limit switch 131 is positioned at the exit end of the low speed section 15 and a limit switch 134 is positioned at the entrance end to the acceleration section 19 for engagement by the vehicles. These limit switches are connected to a control apparatus 135 which is also connected to accelerator drive motors 63 and 67. A grip positioning mechanism like mechanism 109 described hereinabove is located at the entrance end of the acceleration section 19 and has a solenoid 136 for actuating the mechanism. The solenoid 136 is also connected to the control apparatus 135.

A limit switch 137 is provided for the grip positioning mechanism at the entrance end of the acceleration section 19 and performs the same function as limit switch 120 for the grip positioning mechanism 109 at the entrance end of the deceleration section 18.

The limit switch is connected to the control apparatus 135 to align the side grips 73, 75, 76 and 78 over the second cable 59 or third cable 64 in the acceleration section 19. At the entrance end of the acceleration section 19, guide plates 138 and 139 are positioned over second cable 59 and guide plates 141 and 142 are positioned over the third cable 64 for engagement with the grips 73, 75, 76 and 78 to spread the cable clamping shoes 83 and 84 as a vehicle is pushed into the acceleration section 19.

The acceleration drive motors 63 and 67 are also connected to the control apparatus 135 for regulating the speed of the motors to drive the second cable 59 and third cable 64 at the speed of the vehicles in the low speed section 15 when vehicles enter the acceleration section 19. As a vehicle passes into the acceleration section 19, the limit switch 134 is actuated signaling the control apparatus 135 to gradually increase the speed of the motors so that the cables 59 and 64 will be driven at the speed of the high speed cable 44 when the vehicle leaves the acceleration section and reenters the high speed section 13. A limit switch 143 is located alongside the path 12 at a position adjacent the portion 17 where the vehicles reenter the high speed section 13 for contact by a vehicle and transmission of a signal to the control apparatus 135 indicating that the vehicle has left the acceleration section 19 and the cable to which it was clamped is available for clamping by another vehicle.

At the exit end of the acceleration section 19, guide plates 144 and 145 are located along the path 12 above the high speed cable 44 to engage the grips 74 and 77 of the vehicles leaving the acceleration section to spread the clamping shoes 83 and 84 to clear the high speed pulley 48 and then grip the high speed cable 44. Guide plates 146 and 147 are located over the second cable 59 and guide plates 148, 149 are located over the third cable 64 at the exit end of the acceleration section 19 for disengaging the grips 73, 75, 76 and 78 from the cables as the vehicles leave the acceleration section and reenter the high speed section 13.

With reference again to FIGS. 1 and 2, the vehicle 2 is shown leaving the high speed section 13 and entering the deceleration section 18. At this time, the vehicle 2 has actuated limit switch 126 signaling the control apparatus 125 whereupon the solenoid 117 has been actuated to move the carriage member 103 to the right, as shown in FIG. 6, so that the clamps 73 and 76 will clamp the second cable 49. The limit switch 130 is actuated by the vehicle 2 entering the deceleration section 18 and the speed of the drive motor 54 is gradually decreased from the same speed as the high speed cable 44 to the same speed as the vehicles 4 through 8 in the low speed section. The vehicle 3 which is already in the deceleration section 18 is driven by the third cable 55 and the grips 75 and 78 on this vehicle are in clamping relation with the third cable. The motor 58 is gradually decelerating the speed of the cable 55 and the vehicle 3 in the position shown in FIGS. 1 and 2. Vehicle 4 upon entering the low speed section 15 engaged the limit switch 127 signaling the control apparatus 125 to increase the speed of second cable 49 to the same speed as high speed cable 44 so that vehicle 2 would be driven at that speed.

In substantially the same manner, the vehicle 9 engaged limit switch 131 upon leaving the low speed section 15 signaling the control apparatus 135 so that the grip positioning mechanism was actuated by solenoid 136 for the griping of either the second cable 59 or third cable 64. Also, by engagement with limit switch 134, the speed of the motors 63 or 67 was increased to accelerate the vehicle 9 ultimately to a speed substantially the same as the speed of the high speed cable 44 at the exit end.

When vehicle 8 is pushed onto the acceleration section 19, the limit switch 137 will verify the position of the grip positioning mechanism and the control apparatus 135 will shift the mechanism so that the cable gripped by vehicle 8 will be different from that gripped by vehicle 9 and acceleration of this vehicle will be provided independently of the acceleration for vehicle 9.

After vehicle 9 leaves the acceleration section 19, the limit switch 143 will be engaged and a signal transmitted to the control apparatus 135 to reduce the speed of cable to which it was attached to a speed substantially the same as the speed of the vehicles 4 through 8 in the low speed section 15.

Figure 7:
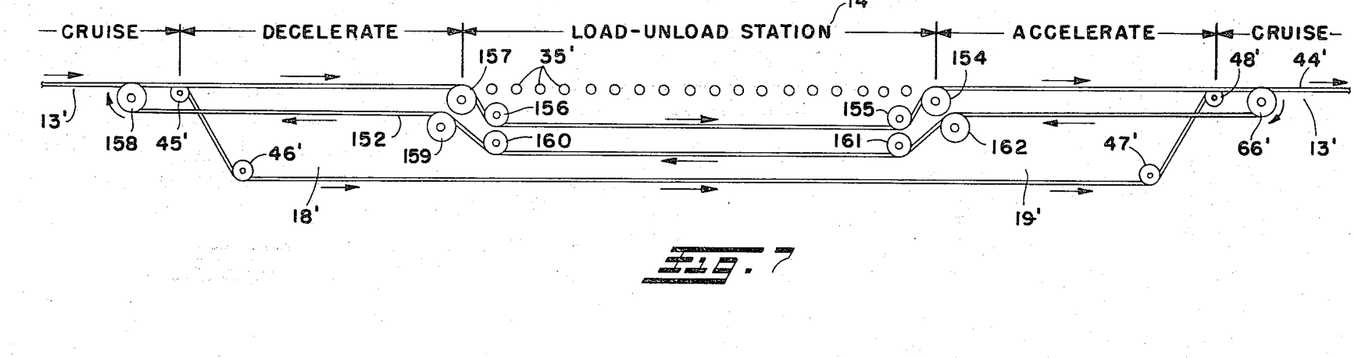
FIG. 7 is a diagramatic side elevational view of a modified cable and roller drive system.

Referring to FIG. 7, a modification embodying the invention is shown in which the construction is the same as that described for FIGS. 1 through 6 but with the second cable 49 and third cable 55 of the deceleration section 18 also serving as the second cable 59 and third cable 64 of the acceleration section 19. The description of this modification only describes the third cable; however, since the second cable is of similar construction, this description will apply to both cables.

The high speed cable 44' is driven over high speed pulleys 45', 46', 47' and 48' to bypass the deceleration section 18', load-unload station 14' and acceleration section 19'. A third cable 152 extends through the deceleration section 18' around the load-unload station 14' and through the acceleration section 19'. A drive pulley 66' is connected to a motor 67' and the speed of the cable 152 is determined by control apparatus 125' and 135' connected to the motor 67'. The cable 152 is guided through the deceleration section 18' around the load-unload stations 14' and through the acceleration 19' by pulleys 154 through 162. A suitable take-up mechanism (not shown) may be provided. The operation of this modification is the same as that of the embodiment shown in FIGS. 1 through 6 except that one motor 67' provides both the deceleration and acceleration of vehicles. In the load-unload station 14', the vehicles are driven by rollers 35' and in the high speed section 13' the vehicles are driven by the high speed cable 44'.

Figure 8:
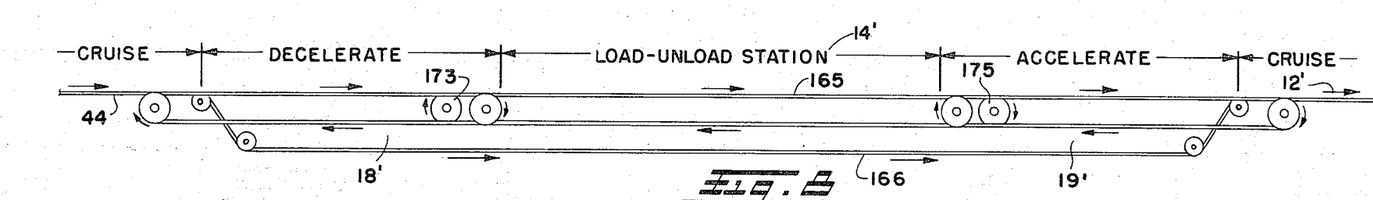
FIG. 8 is a diagramatic side elevational view of another modified cable drive system embodying the invention.
Figure 9:
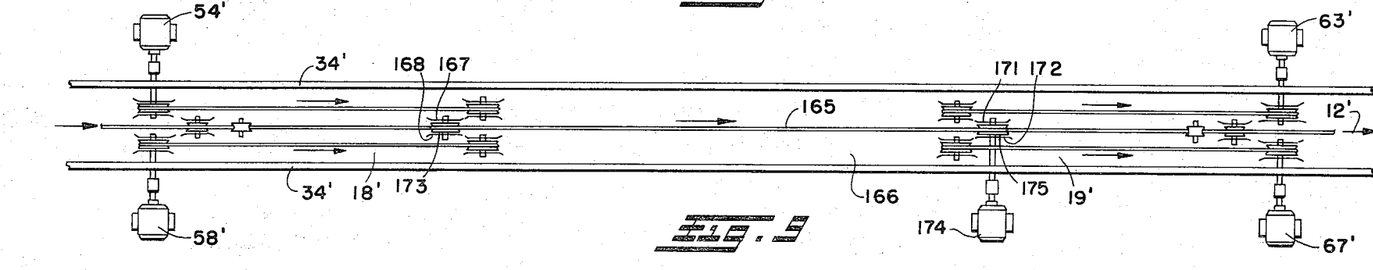
FIG. 9 is a plan view like FIG. 4 of the modification shown in FIG. 8.

Referring to FIGS. 8 and 9, another modification is shown which is the same as the embodiment of FIGS. 1 through 6 except for the load-unload station 14 and low speed section 15. In FIGS. 8 and 9, a low speed cable 165 is provided to drive the vehicles through a low speed section 166. In this modification, beams 34' extend through the load-unload station 14' and the vehicles engage the low speed cable 165 upon leaving the deceleration section 18'. Guide plates 167 and 168 are mounted above the low speed cable 165 along the path 12' at the exit end of the deceleration section 18' to spread the center grips 74' and 77' of the vehicles and then release them for clamping of the cable 165. when the vehicles leave the low speed section 166, the grips 74' and 77' are spread by engagement with guides plates 171 and 172 mounted above the low speed cable 165 along the path 12' at the entrance end to the acceleration section 19'. The low speed cable 165 is driven by a driving pulley 175 connected to a motor 174 at the exit end of the low speed section 166. An idler pulley 173 supports the cable 165 at the entrance end of the low speed section 166 and a suitable take-up mechanism (not shown) may be provided.

Figure 10:
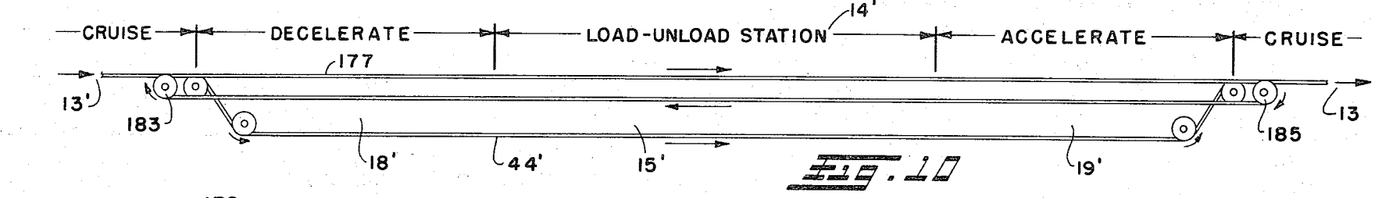
FIG. 10 is a diagramatic side elevational view like FIG. 3 of still another modification.
Figure 11:
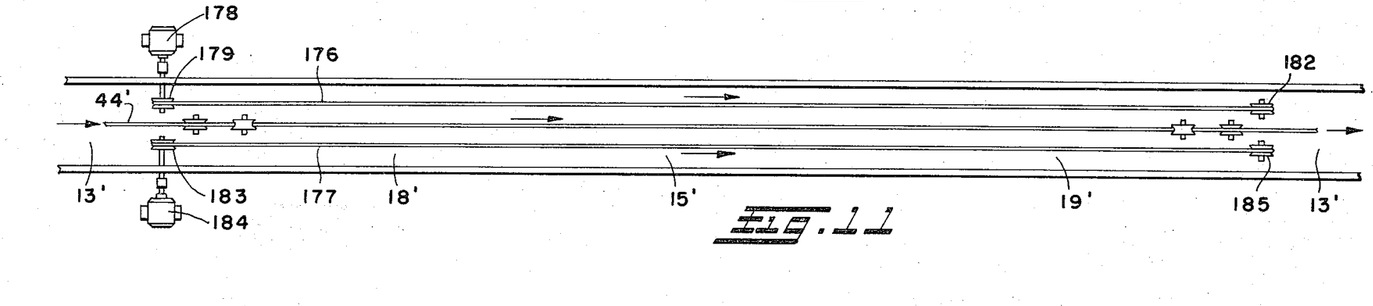
FIG. 11 is a plan view like FIG. 4 of the modification shown in FIG. 10.

With reference to FIGS. 10 and 11, a further modification is shown which is like the embodiment described in FIGS. 1 through 6 except that a second cable 176 and a third cable 177 drive the vehicles through the deceleration section 18', low speed section 15' and acceleration section 19'. A drive motor 178 rotates a pulley 179 to propel the second cable 176 at the same speed as the high speed cable 44' at the entrance to the deceleration section 18', gradually decelerates the speed of the vehicle to the speed of the low speed section 15' in the load-unload station 14' and then accelerates the vehicle in the acceleration section 19' to the speed of the high speed cable 44' to which the vehicle is again clamped in the high speed section 13'. An idler pulley 182 for the second cable 176 is mounted at the end of the acceleration section 19' and suitable take-up mechanism (not shown) may be provided.

The third cable 177 is driven by a driving pulley 183 connected to a drive motor 184 in a manner similar to the drive of the second cable 176. An idler pulley 185 at the exit end of the acceleration section 19' and suitable take-up mechanism (not shown) are provided around which the third cable 177 passes.

Figure 12:
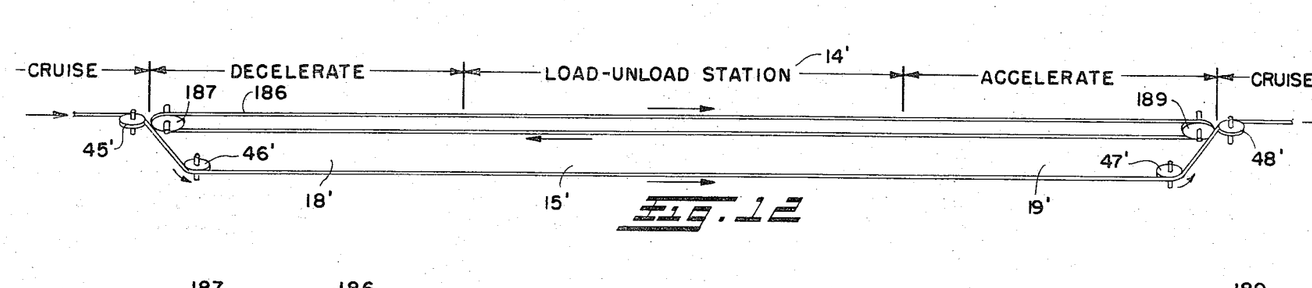
FIG. 12 is a diagramatic side elevational view like FIG. 3 of another modification.
Figures 13, 14, 15:
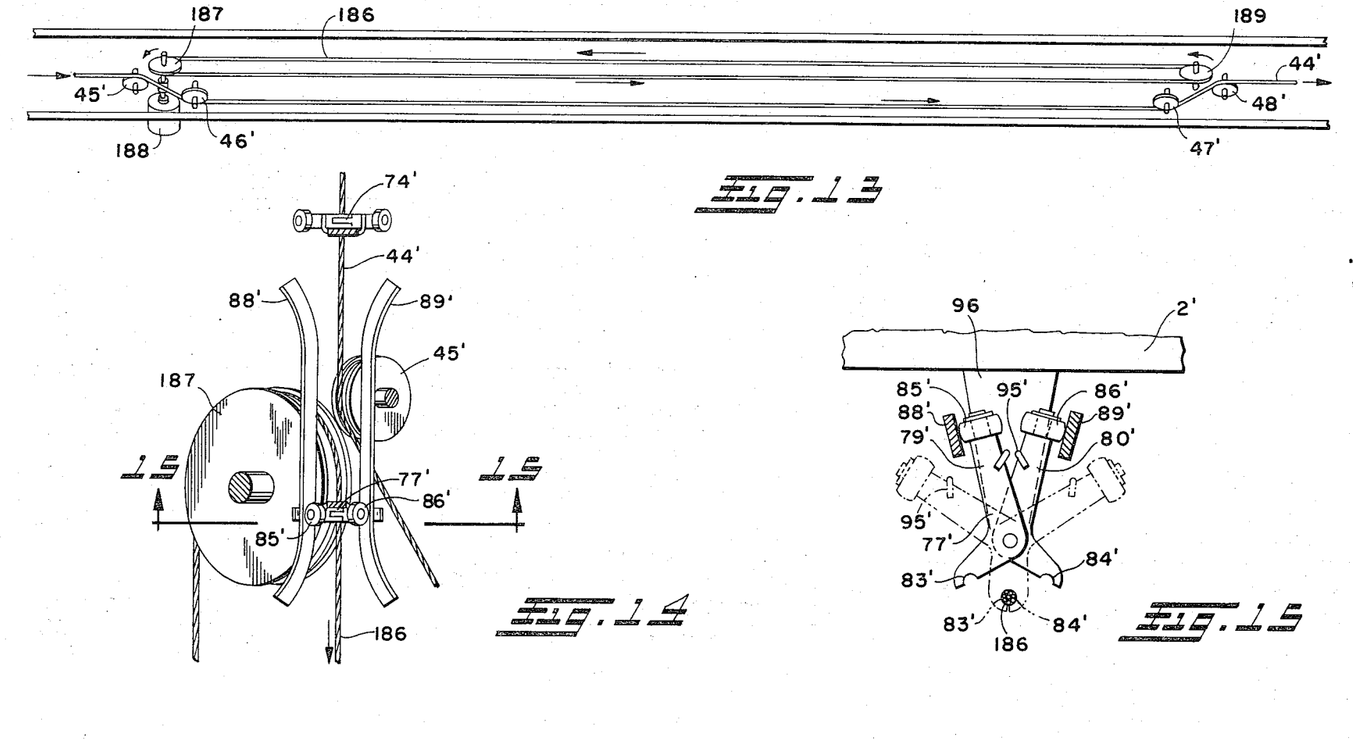
FIG. 13 is a plan view like FIG. 4 of the modification shown in FIG. 12.
FIG. 14 is an enlarged diagramatic plan view like FIG. 5 of a single post grip mounted on a vehicle driven in the system shown in FIGS. 12 and 13.
FIG. 15 is an enlarged end view of the single post grip shown in FIG. 14, taken along the plane of line 15—15 with parts being deleted and broken away.

Referring to FIGS. 12 and 13, a further modification is shown which is like the vehicle drive system shown and described in FIGS. 1 through 6 except that instead of a second and third cable for carrying the vehicles through the deceleration section 18', low speed section 15' and acceleration section 19', a single cable 186 is provided. Also only center post grips 74' and 77', guide plates 88' and 89' at the beginning of the deceleration section 18' and the guide plates 145' and 146' at the exit end of the acceleration section 19' are required. The single cable 186 is driven by a drive pulley 187 connected to a driver motor 188. An idler pulley 189 at the exit end of the acceleration section 19' for returning the single cable 186 and suitable take-up mechanism (not shown) are provided.

As shown in FIGS. 12, 13 and 14, the drive pulley 187 and the idler pulley 189 are canted so as to keep the single cable 186 in alignment with the high speed cable 44' and to make possible minimum spacing between the ends of cables 186 and 44'. The high speed pulleys 45', 46', 47' and 48' are also canted in the other direction to maintain the high speed cable 44' in alignment with the single cable 186. Referring to FIG. 15, as the vehicle 2' enters the deceleration section 18', the cam rollers 85' and 86' will be engaged by the guide plates 88' and 89' bringing the upper ends of the lever arms 79' and 80' closer together and opening the cable clamping shoes 83' and 84' to disengage the shoes from the high speed cable 44'. Upon further movement of the vehicle 2' which is still in engagement with the high speed cable 44' through grip 74' the upper ends of the lever arms 79' and 80' will be released by the guide plates 88' and 89' and the clamping shoes 83' and 84' moved into engagement with the single cable 186 by the spring 95' in the position shown in chain-dotted lines in FIG. 15.

At the exit end of the acceleration section 19', the grips 74' and 77' engage the guide plates 145' and 146' disengaging the grips from the single cable 186 and engaging the high speed cable 44'. The motor 188 is connected to a control apparatus 135' and the speed of the motor is controlled so that vehicles entering the deceleration section 18' grip the single cable 186 at the same speed as the high speed cable 44'. Speed of the motor is then controlled so that the vehicle is decelerated in the deceleration section 18' to the low speed of the load-unload station 14' and maintained at a low speed in the low speed section 15' until it reaches the acceleration section 19' where it is accelerated to a speed substantially the same as the speed of the high speed cable 44' at the end of the acceleration section 19'. The vehicle is then disengaged from the single cable 186 and reengaged with the high speed cable 44' at which time another vehicle may enter the deceleration section 18' for deceleration, low speed travel at the station 14' and acceleration to high speed.

While certain representative embodiments and details have been shown for the purpose of illustrating the invention, it will be apparent to those skilled in the art that various changes and modifications may be made therein without departing from the spirit or scope of the invention.

I claim:

1. A vehicle drive system comprising a first endless drive member for driving engagement with a first vehicle and a second vehicle along a path in a constant speed section of the system, a second endless drive member for driving engagement with said first vehicle in a variable speed section of the system, a third endless drive member for driving engagement with said second vehicle in said variable speed section of the system, means for gradually changing the speed of said second endless drive member between the speed of said first endless drive member and a different speed in a different speed section of said system whereby the speed of said first vehicle can be gradually changed from said speed of said first endless drive member to said different speed and a second means for gradually changing the speed of said third endless drive member whereby more than one vehicle is driven at gradually changing speeds in said variable speed section at the same time.

2. A vehicle cable drive system comprising a first cable for driving engagement with a vehicle along a path in a constant speed section of the system, a second cable for driving engagement with said vehicle in a variable speed section of the system and a clamping mechanism for gripping said first cable in said constant speed section and for gripping said second cable in said variable speed section and means for gradually changing the speed of said second cable between the speed of said first cable and a different speed in a different speed section of said system whereby the speed of said vehicle can be gradually changed from said speed of said first cable to said different speed.

3. A vehicle cable drive system according to claim 2, wherein said constant speed section is a high speed section, said different speed of said different speed section is a low speed in a low speed section and said variable speed section is a deceleration section with said means for gradually changing the speed of said second cable slowing the vehicle from said high speed to said low speed.

4. A vehicle cable drive system according to claim 3 further comprising a separate drive member for propelling said vehicle at a low speed in said low speed section.

5. A vehicle cable drive system according to claim 4 further comprising an acceleration section between said low speed section and said high speed section, an accelerating cable in said acceleration section for driving engagement with said vehicle and means for gradually increasing the speed of said accelerating cable from said low speed to said high speed.

6. A vehicle cable drive system according to claim 1, wherein said constant speed section has spaced-apart portions, said variable speed section and said different speed section of said system are located between said spaced-apart portions of said constant speed section and said first cable extends continuously between said spaced-apart portions and around said variable speed section and said different speed section.

7. A vehicle cable drive system according to claim 2 wherein said second cable continues in driving engagement with said vehicle through said variable speed section and said different speed section.

8. A vehicle cable drive system according to claim 7 wherein said variable speed section includes an acceleration section and a deceleration section interposed between said constant speed section and said different speed section and said means for gradually changing the speed of said second cable, accelerates, decelerates and drives said cable at said different speed.

9. A vehicle drive system comprising a first endless drive member for driving engagement with a vehicle along a path in a constant speed section of the system, a second endless drive member for driving engagement with said vehicle in a variable speed section of the system, a clamping mechanism for gripping said first endless drive member in said constant speed section and for gripping said second endless drive member in said variable speed section, said clamping mechanism having two grips with one grip releasable from gripping engagement with said first endless drive member as the other grip is closed on said second endless drive member, and means for gradually changing the speed of said second endless drive member between the speed of said first endless drive member and a different speed in a different speed section of said system whereby the speed of said vehicle can be gradually changed from said speed of said first endless drive member to said different speed.

10. A vehicle drive system according to claim 9 wherein said one grip further comprises a pair of lever arms hingedly connected to said vehicle at positions spaced from the ends of said lever arms, said arms having opposing gripping surfaces at one end of each of said arms for gripping said endless drive member, cam engaging surfaces at the other end of each of said arms and cam members mounted along said path in positions for engagement by said cam engaging surfaces to move said gripping surfaces out of engagement with said first endless drive member and spring means mounted on said arms for closing said gripping surfaces and urging said gripping surfaces into engagement with said second endless drive member.

11. A vehicle drive system according to claim 9 wherein said vehicle and a second vehicle each has a clamping mechanism for gripping said frist endless drive member in said constant speed section and for gripping said second endless drive member and a third endless drive member in said variable speed section.

12. A vehicle drive system according to claim 11 wherein said clamping mechanism further comprises two grips with one grip releasable from gripping engagement with one of the endless drive members as the other grip is closed on the other endless drive member.

13. A vehicle drive system according to claim 12 wherein said clamping mechanism includes selective means for controlling the position of said grips for driving engagement of said vehicle with said second endless drive member and driving engagement of said second vehicle with said third endless drive member in said variable speed section.

14. A vehicle drive system according to claim 13 wherein said selective means comprises a transversely extending carriage, said grips being mounted on said carriage for driving engagement with said second endless drive member and said third endless drive member, said carriage being slidably supported on said vehicle from one position in which one of said grips is in position to grip said second endless drive member to another position where another of said grips is in a position to grip said third endless drive member in said variable speed section and means mounted along said path for shifting said carriage from one position to the other.

15. A vehicle drive system comprising a first endless drive member for driving engagement with a vehicle along a path in a constant speed section of the system, a second endless drive member for driving engagement with said vehicle in a variable speed section of the system and means for gradually changing the speed of said second endless drive member between the speed of said first endless drive member and a different speed in a different speed section of said system, said variable speed section including an acceleration section and a deceleration section interposed between said constant speed section and said different speed section, said second endless drive member extending around said different speed section and through said acceleration section and deceleration section and being in driving engagement with said vehicle through said acceleration section and said deceleration section, and said means for gradually changing the speed of said second endless drive member accelerating and decelerating said second drive member in said acceleration section and said deceleration section whereby the speed of said vehicle can be gradually changed from said speed of said first endless drive member to said different speed.

* * * * *

UNITED STATES PATENT OFFICE
CERTIFICATE OF CORRECTION

PATENT NO. : 3,871,303
DATED : March 18, 1975
INVENTOR(S) : Gerald L Woodling

It is certified that error appears in the above-identified patent and that said Letters Patent are hereby corrected as shown below:

Claim 6, line 1, "1" should read --2--.

Claim 11, line 3, "frist" should read --first--.

Signed and Sealed this second Day of December 1975

[SEAL]

Attest:

RUTH C. MASON
Attesting Officer

C. MARSHALL DANN
Commissioner of Patents and Trademarks